(12) United States Patent
Chong et al.

(10) Patent No.: US 6,708,178 B1
(45) Date of Patent: Mar. 16, 2004

(54) SUPPORTING B+TREE INDEXES ON PRIMARY B+TREE STRUCTURES WITH LARGE PRIMARY KEYS

(75) Inventors: Eugene I. Chong, Concord, MA (US); Souripriya Das, Nashua, NH (US); Charles G. Freiwald, Amherst, NH (US); Jagannathan Srinivasan, Nashua, NH (US); Aravind Yalamanchi, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 374 days.

(21) Appl. No.: 09/871,720

(22) Filed: Jun. 4, 2001

(51) Int. Cl.[7] .............................................. G06F 17/30
(52) U.S. Cl. ...................................... 707/101; 707/102
(58) Field of Search .............................. 707/1, 2, 3, 4, 707/5, 6, 7, 8, 9, 10, 100, 103, 200

(56) References Cited

U.S. PATENT DOCUMENTS

| | | | |
|---|---|---|---|
| 5,363,098 A | 11/1994 | Antoshenkov | 341/95 |
| 5,852,822 A | 12/1998 | Srinivasan et al. | 707/4 |
| 5,893,104 A | 4/1999 | Srinivasan et al. | 707/102 |
| 6,266,660 B1 * | 7/2001 | Liu et al. | 707/3 |
| 6,349,308 B1 * | 2/2002 | Whang et al. | 707/103 Z |

OTHER PUBLICATIONS

Spatial Quadtree Indexing, Oracle Spatial User's Guide and Reference for Oracle Release 8.1.6, Dec. 1999.

* cited by examiner

*Primary Examiner*—Diane D. Mizrahi
*Assistant Examiner*—Yicun Wu
(74) *Attorney, Agent, or Firm*—Swidler Berlin Shereff Friedman LLP

(57) ABSTRACT

A system for organizing and accessing a database. The system includes a primary B+tree index, a secondary B+tree index, a plurality of mapping table row identifiers stored in the secondary B+tree index and a plurality of database addresses for leaf blocks of the primary B+tree index corresponding to mapping table rows.

15 Claims, 2 Drawing Sheets

SUPPORTING B+TREE INDEXES ON PRIMARY B+TREE STRUCTURES WITH LARGE PRIMARY KEYS

FIELD OF THE INVENTION

The present invention relates to organizing and accessing data in a database and database indexes. In particular, the present invention relates to indexes and secondary index structures for indexing a table stored as primary B+tree. More particularly, the present invention relates to methods and structures for organizing and accessing databases indexed with primary B+tree structures.

BACKGROUND OF THE INVENTION

In a typical relational database system, users store, .update, and retrieve information by interacting with user applications. The user applications respond to a user's interaction by submitting commands to a database application, or server, responsible for maintaining the database. The database server responds to commands by performing the specified actions on the database. To be correctly processed, the commands must comply with the database language that the database server supports. One popular database language is known as Structured Query Language (SQL).

Various access methods may be utilized to retrieve data from a database. The access methods used to retrieve data may significantly affect the speed of the retrieval and the amount of resources consumed during the retrieval process. Many information retrieval applications make use of indices when performing content-based searches on the database data. Examples of database indices include R–trees, quadtrees, and B–trees.

Database indices provide organization and reference to the data in a database to permit a user to find particular items of data in the database or determine relationships among the data in the database. Database indices can also permit relationships between the data in a database and data not included in the database to be determined.

Typically, such indices are implemented using a B–tree index. The index is typically built on the columns of the table, each index entry in the index having the form <column_value, rowid>, where "rowid" uniquely identifies the row within the table that corresponds to the index entry.

Many applications involve data sets in which individual rows are identified by a primary key. The primary key uniquely identifies each row within the table and may be formed from a single column, such as social security number for an employee, or may be formed from multiple columns, such as an area code plus a seven digit local phone number. For such a table, a primary key index can be utilized.

Entries within a primary key index may have the form <primary key value(s), rowid>. A primary key index typically provides good query performance when only indexed columns are referenced in the query, in so-called index-only scans. If non-indexed columns are referenced, an index-based scan may be utilized. In an index-based scan, the primary key index structure may be traversed to obtain a rowid, which may be then utilized to access the rows within the table structure.

To avoid duplication of the primary key values as well as to speed up primary key-based retrieval efforts, a primary B+tree structure has been introduced, which may include not only the indexed column values, but also all the remaining column values of the table in the leaves of the index structure, thus rendering maintenance of a separate table unnecessary. Each row, therefore, may include both key and non-key columns. The non-key columns may be stored along with the key columns. As a result, primary B+tree structures do not incur additional input/output overhead to access the non-key columns as with a conventional table's index-based scan.

As with a conventional heap-organized table/index pair, primary B+tree structure provides good query performance for data included in the column or columns forming the primary key. To aid in the retrieval efforts of queries based upon non-primary key columns, secondary index structures may be provided. Entries within the secondary structure may have the form <secondary key value, primary key value>.

For index-only scans, data may be extracted directly from the secondary index structure. For index-based scans, the secondary index structure may first be traversed to obtain the corresponding primary key value. The primary key value may then be utilized in a full primary key index scan of the primary B+tree structure to obtain values from other columns that are of interest.

Primary B+trees may themselves be indexed. Typically, primary key based logical row identifiers are used in secondary indexes for primary B+tree structures. However, if primary key is large, then the size of secondary index will be large leading to high storage costs, and degradation in secondary index scan performance. No known solutions exist that can address this issue.

SUMMARY OF THE INVENTION

The present invention provides a system for organizing and accessing a database. The system includes a primary B+tree index and a secondary B+tree index. A plurality of mapping table row identifiers are stored in the secondary B+tree index. A plurality of database addresses for leaf blocks of the primary B+tree index corresponding to mapping table rows are also stored in the secondary B+tree index.

Additionally, the present invention concerns a method for managing a database system. According to the method, a secondary index is created for a primary B+tree structure. The secondary index structure includes a plurality of rows each comprising an index key value, a mapping table rowid value and a guess-database block address value.

Also, the present invention provides a computer program product for performing a process of managing a database system. The computer program product includes a computer readable medium and computer program instructions recorded on the computer readable medium and executable by a processor. The computer program instructions performing the steps of creating a secondary index for a primary B+tree structure, wherein the secondary index structure includes a plurality of rows each comprising an index key value, a mapping table rowid value and a guess-database block address value.

Furthermore, the present invention provides a system for performing a database management process. The system includes a processor operable to execute computer program instructions; and a memory operable to store computer program instructions executable by the processor. The computer program instructions performing the steps of creating a secondary index for a primary B+tree structure, wherein the secondary index structure includes a plurality of rows each including an index key value, a mapping table rowid value and a guess-database block address value.

Still other objects and advantages of the present invention will become readily apparent by those skilled in the art from a review of the following detailed description. The detailed description shows and describes preferred embodiments of the present invention, simply by way of illustration of the best mode contemplated of carrying out the present invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

Figure 1:
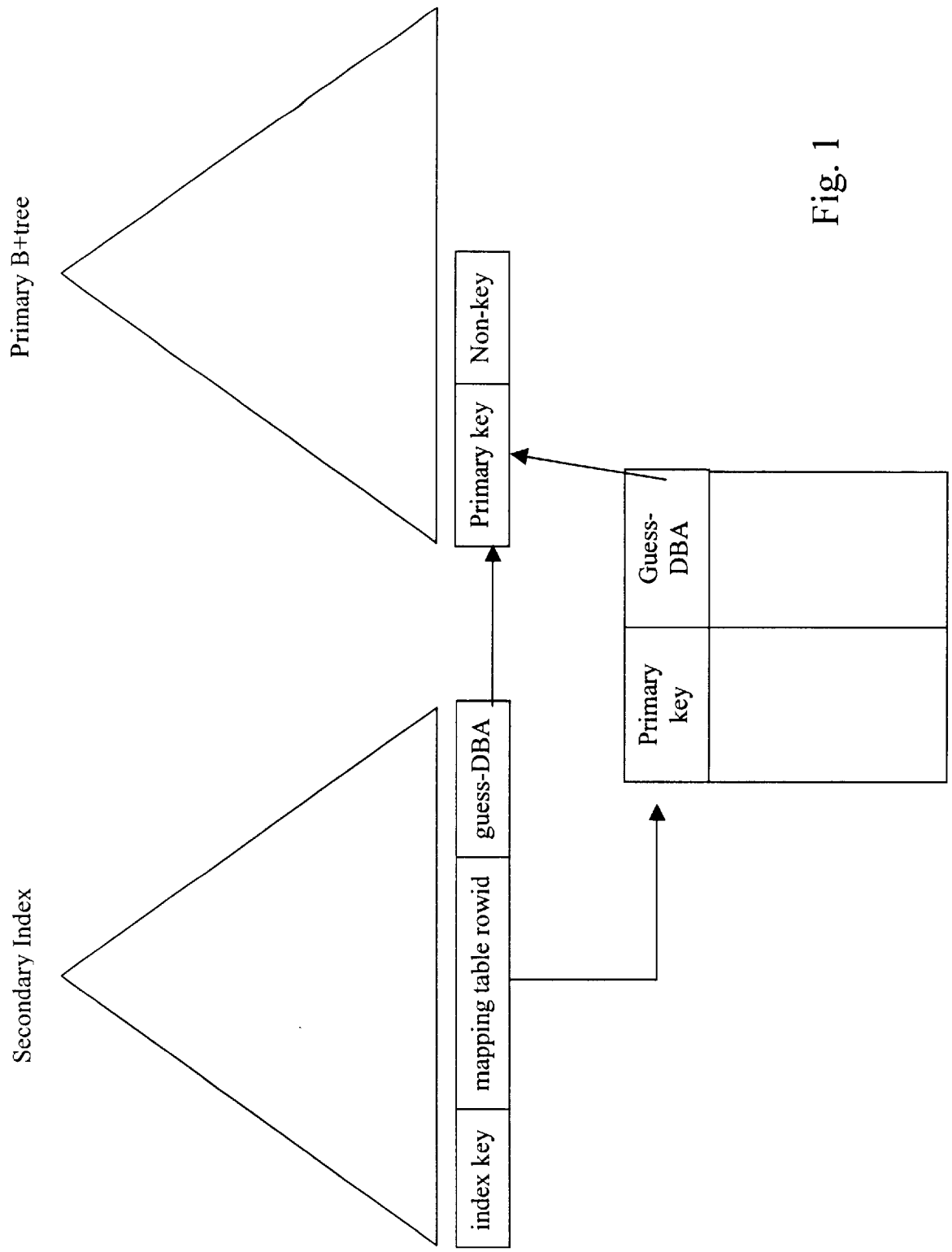
FIG. 1 represents a simplified diagram that illustrates aspects of an embodiment of a database organization according to the present invention.

An issue that arises in database organizational structures is that if logical row identifiers are large and are stored in secondary indexes utilized with a database primary B+tree index, then storage requirements will increase. As a result, maintenance of secondary index structures where the logical row identifiers are stored can become costly. The present invention can also address this problem.

A significant number of applications deal with data sets where each individual row is identified by a primary key. The primary key could be a single column such as social security number for an employees table in a HR application, or a multi-column entity such as <warehouse, district, order, order line>for orders table in a product sales and distribution business application. For such applications, if the query workload were dominated by primary-key access, then clustering the rows of the table in the primary key order would be beneficial. In fact, several DBMSs provide a variant of B+trees with row data in leaf node, also referred to as primary B+trees, to speed-up primary key-based access to the table data. A primary B+tree is a variant of a B+tree structure with row data in leaf blocks.

Primary B+tree structure can include indexed columns as well as all remaining columns of a table. Each row in primary B+tree structure can consist of key and non-key columns. The non-key columns may be stored along with the key columns in a primary B+tree, making the whole table structure have an index-organization. Typically, the entire table data can be held in its primary key index. The benefits of this organization are that it provides fast random access on the primary key because an index-only scan is sufficient. Once a leaf block is reached, both the key as well as the non-key columns can be retrieved. A primary B+tree structure can provide fast range access on the primary key because the rows may be clustered in primary key order and they contain both key and non-key columns. Also, utilizing primary B+tree structure can avoid duplication of primary key columns as in a heap-organized table with a primary key index.

Oracle Corporation has developed a particular type of primary B+tree structure. Distinguishing features of Oracle's primary B+tree structure, also known as index-organized tables, when compared to other primary B+tree implementations include support for a heap-organized overflow storage area that provides supplementary storage for columns. This allows controlling the placement of columns in the index versus overflow storage area and provides the capability for tuning the number of rows that fit in an index leaf. Infrequently accessed non-key columns of the index-organized table can be pushed to the overflow storage area, by specifying the percentage of space reserved for a row in the index block, and/or specifying a column at which a row should be divided into index and overflow portions. This increases the leaf row density, that is, the number of index rows that can fit in a leaf block of the primary B+tree structure.

Index-organized tables also provide support for secondary indexes with logical primary key-based row identifiers, which include the primary key as well as a database block address (DBA). This DBA, referred to as guess-DBA, is treated as a guess as to where the row may be found in the base table (primary B+tree). A valid guess will cost only a single block I/O. However, if the guess is invalid, the primary key is used to find the row. Thus, for valid guess-DBAs, the secondary index performance is comparable to that of secondary index with physical row identifiers. At the same time, the logical nature of secondary indexes enables faster reorganization and increased uptime of the base table since they need not be updated during such a reorganization. Support for online guess-DBA fixing allows regaining the guess-DBA based performance.

Index-organized tables also provide support for compressing common (column) prefixes of the primary key. Since the rows are clustered in the primary key order, there is more likelihood of finding common prefixes.

Index-organized tables are suitable for order processing applications with 24×7 availability requirements such as for E-Commerce. Specifically, faster reorganization is achieved due to the logical nature of secondary indexes. Index-based scan performance degradation is avoided through use of guess-DBAs. The guess-DBA based performance may be retained by online fixing of any guess-DBAs invalidated during reorganization. Key-compressed index-organized tables are suitable for Internet applications that may require a hierarchical storage organization, such as portals and electronic storefronts. Internet search engines and text databases can implement the inverted index, the fundamental data structure needed for full-text search, as an index-organized table. The need to handle variable length rows in the inverted index without degrading access to small rows can be satisfied by using index-organized table column placement options. Index-organized tables can also be utilized for fact tables in data warehousing applications.

The present invention relates to database systems that include B+tree index structures. In particular, the present invention relates to primary B+tree structures indexed with a secondary B+tree structure. FIG. 1 provides a simplified diagram that illustrates a secondary index, a primary B+tree, and a mapping table.

Mapping table row identifiers are stored in the secondary B+tree. For the primary B+tree structures, an additional mapping table can be created as described in a U.S. patent application filed on even date herewith for "Mapping Logical Row Identifiers For Primary B+Tree-Like Structures To Physical Row Identifiers", to Chong et al., and having attorney docket number 19111.0038, to supporting bitmap indexes, which are described in a U.S. patent application filed on even date herewith for "Supporting Bitmap Indexes on Primary B+tree Structures", to Chong et al., and having attorney docket number 19111.0040, the entire contents of the disclosures of both of which are hereby incorporated by reference. Also, bitmap indexes are described in greater detail in U.S. Pat. No. 5,363,098, for "Byte Aligned Data Compression", issued Nov. 8, 1994, to Antoshenkov, the entire contents of the disclosure of which are hereby incorporated by reference. Additionally or alternatively, secondary indexes can be created with logical row identifiers as described in U.S. Patent Application Ser. No. 09/473,073, to Chong et al., filed Dec. 28, 1999, for "Database System Having Logical Row Identifiers", the entire contents of the disclosure of which is hereby incorporated by reference. Both supporting bitmap indexes and secondary indexes can be utilized to store physical data block address to speed up query performance.

Mapping table row identifiers (rowid) are stored in the secondary B+tree index. Additionally, the B+tree index stores a plurality of database addresses for leaf blocks of the primary B+tree index that correspond to mapping table rows. The database block addresses include the guess-database block addresses described above. To address storage space and cost concerns, only 4 bytes of the database block addresses may be stored in the secondary B+tree structure.

As described below in greater detail, the system according to the present invention may also include guess quality statistics that permit the present invention to determine the lowest cost manner for carrying out a query. Along these lines, the system according to the present invention may include a guess-DBA quality statistic for both the secondary B+tree structure and the mapping table. The statistics can assess the guess-database block address quality to determine how accurate the guess-database block addresses are at indicating the actual location in the database where a query response resides. If either the secondary index structure or the mapping table is providing more lower cost answers, then the system will divert the query processing to that structure.

In view of the make-up of a system according to the present invention, a method according to the present invention can include creating a mapping table as described above. Also, a secondary index is created for a primary B+tree structure. Typically, the secondary index is a B+tree. The secondary index includes a plurality of rows each storing an index key value, a mapping table row identification value, and a guess-database block address value.

Throughout its useful life, as the database grows, the secondary index is updated to account for this. Updates of the secondary index may be accomplished by first inserting a row that includes an index key value, a mapping table rowid value and a guess-database block address value. On the other hand, when deleting a row of the secondary index, finding a row having a specified an index key value and a mapping table row identifier and then deleting the row.

When updating the secondary index, a row of the secondary index is located that includes an old index key and a mapping table row identifier. The row of the secondary index is deleted and in that row a new index key value, a mapping table row identifier and a guess database block address are inserted.

Queries of the system according to the present invention may be carried out in different ways, depending at least in part upon the statistics described above. According to one method, carrying out a query includes utilizing a guess-database block address stored as part of the secondary index row to find a row in the primary B+tree structure. A target database block is obtained from the row in the primary B+tree structure. The target database block is searched for a row that contains a mapping table row identifier that is the same as a mapping table row identifier stored in the secondary index row. If the row in the database block matches the target database block, then the correct row in the database has been located and the query is completed.

On the other hand, if the database blocks do not match, then further processing may be carried out. In such cases, the mapping table row identifier stored in the secondary index row is used to access the mapping table row. A guess-database block address stored in the mapping table row is utilized to access a target block of the database. The target block is searched for a primary key that matches a primary key stored in the mapping table row. If the primary key is found, then the query is completed.

In some cases, the primary key is not located. In these instances, the query may then further include traversing the primary B+tree structure utilizing the primary key value from the mapping table row to identify the database block address to complete the query. Such steps would be the last resort since they require additional processor time and, therefore, a greater associated cost.

As referred to above, to help provide efficient searching of the database system, from both cost and time standpoints, the present invention can include maintaining a guess-database block address quality statistic for both the secondary index and for the mapping table. The statistics provide a ratio of how often the guess-database block address corresponds to the actual database block address where the answer to the query is found. By having separate statistics for both of these structures, the present invention can utilize the statistics to assess guess-database block address quality for each query path.

The query is executed based upon guess-database quality in the secondary index and mapping table. In cases where the statistics indicate that the secondary index provides a better-cost result more often, this will mean that a query is completed utilizing the secondary index as described above. In other cases, where the statistics indicate that the mapping table provides better cost results, the mapping table will be utilized. In some cases the statistics will indicate that both the secondary index structure and the mapping table provide poor cost results, the primary B+tree structure will be traversed as described above.

To help ensure that the quickest and cheapest method is utilized, the present invention can estimate guess-database block address quality. The cost of the query based upon the estimated guess-database block address quality may then be estimated. The query may then be carried out starting with an index structure with the lowest estimated cost.

Figure 2:
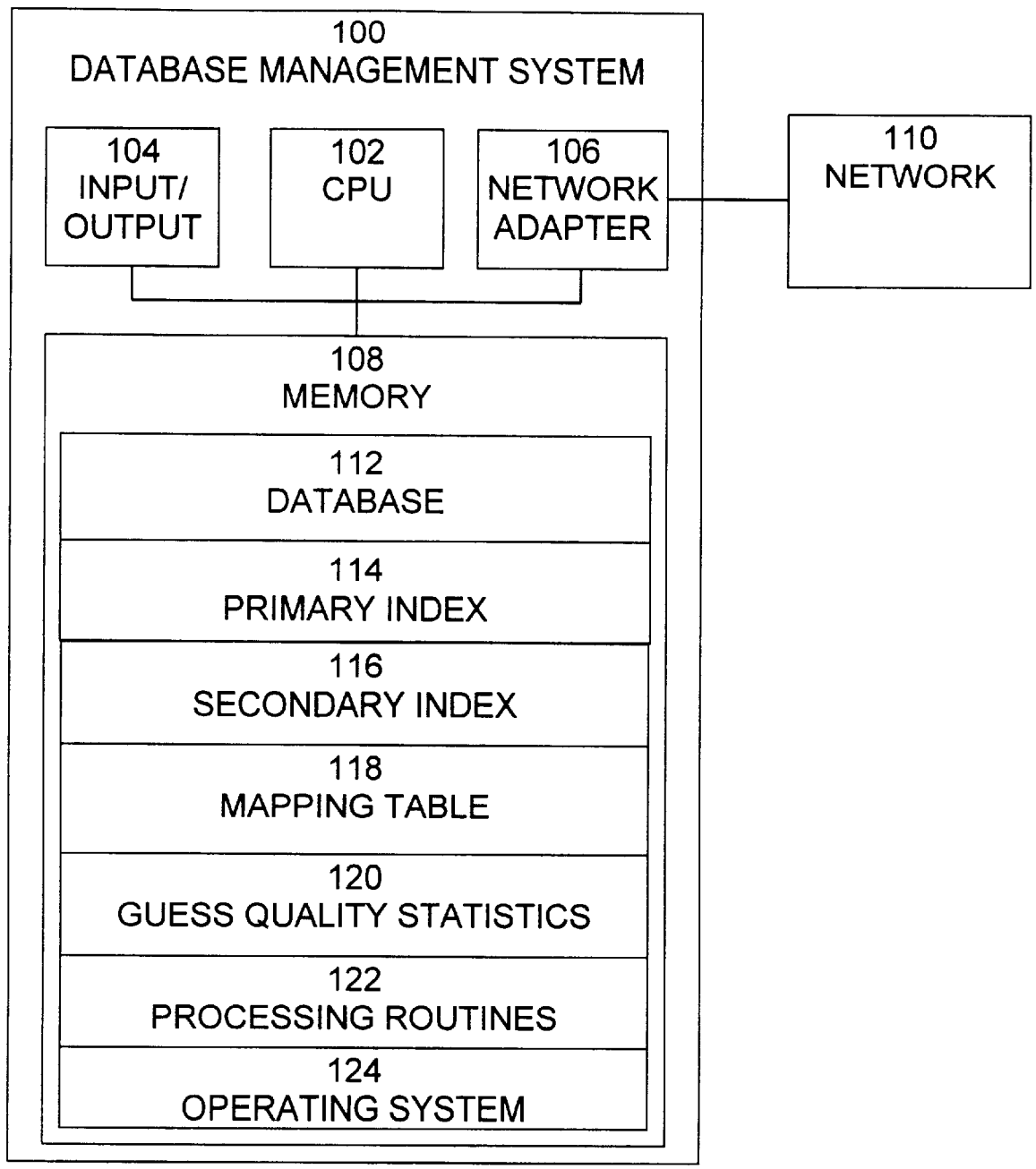
FIG. 2 represents a block diagram of an embodiment of a database management system according to the present invention.

The present invention also includes a system and a computer program product. FIG. 2 represents an exemplary block diagram of a database management system 100, according to the present invention. Database management system 100 is typically a programmed general-purpose computer system, such as a personal computer, workstation, server system, and minicomputer or mainframe computer. Database management system 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor. Input/output circuitry 104 provides the capability to input data to, or output data from, computer system 100. For example, input/output circuitry may include input devices, such as keyboards, mice, touchpads, trackballs, scanners, and/or other suitable input devices; output devices, such as video adapters, monitors, printers, and/or other suitable output device; and input/output devices, such as, modems, and/or other suitable input/output devices. Network adapter 106 interfaces database management system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable readonly memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as database block 112, primary index block 114, secondary index block 116, mapping table block 118, guess quality statistics block 120, and a plurality of blocks of program instructions, such as processing routines 122 and operating system 124. Database block 112 stores the data in the database. Primary index block 114 stores a primary index for the database management system 100. Secondary index block 116 stores the secondary index structure. Mapping table block 118 stores the mapping table. Guess quality statistics for the various index structures are stored in block 120. Processing routines 122 are software routines that implement the processing performed by the present invention. Operating system 124 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A system for organizing and accessing a database, the system comprising:
   a primary B+tree index;
   a secondary B+tree index;
   a plurality of mapping table row identifiers stored in the secondary B+tree index;
   a plurality of database addresses for leaf blocks of the primary B+tree index having mapping row identifiers corresponding to mapping table rows;
   estimating guess-database block address quality;
   estimating the cost of the query based upon the estimated guess-database block address quality; and
   carrying out the query starting with an index structure with the lowest estimated cost.

2. The system according to claim 1, wherein 4 bytes of the database addresses are stored in the secondary B+tree index.

3. The system according to claim 1, wherein the database addresses correspond to a guess-database block address.

4. The system according to claim 1, further comprising:
   a guess-database block address quality statistic for the secondary index and a guess-database block address quality statistic for the mapping table, both statistics being operable to assess guess-database block address quality.

5. A system for performing a database management process, comprising
   a processor operable to execute computer program instructions; and
   a memory operable to store computer program instructions executable by the processor, for performing the steps of:
   creating a secondary index for a B+tree structure, wherein the secondary index structure comprises a plurality of rows each comprising an index key value, a mapping table rowid value and a guess-database block address value;
   estimating guess-database block address quality;
   estimating the cost of the query based upon the estimated guess-database block address quality; and
   carrying out the query starting with an index structure with the lowest estimated cost.

6. A method for managing a database system, the method comprising:
   creating a secondary index for a B+tree structure, wherein the secondary index structure comprises a plurality of rows each comprising an index key value, a mapping table rowid value and a guess-database block address value.

7. The method according to claim 6, further comprising:
   inserting a row of the secondary index structure, wherein inserting the row comprises inserting a row comprising an index key value, a mapping table rowid value and a guess-database block address value.

8. The method according to claim 6, further comprising:
   deleting a row of the secondary index, wherein deleting the row comprises locating a row comprising an index key value and a mapping table row identifier and deleting the row.

9. The method according to claim 6, further comprising:

updating the secondary index, wherein updating the secondary index comprises locating a row of the secondary index comprising an old index key and a mapping table row identifier, deleting the row and inserting in the row a new index key value, a mapping table row identifier and a guess database address.

10. The method according to claim 6, further comprising carrying out a query utilizing the secondary index, wherein carrying out the query comprises:

utilizing a guess-database block address stored as part of a secondary index row to find a row in the primary B+tree structure;

obtaining a target database block from the row in the primary B+tree structure;

searching the target database block for a row that contains a mapping table row identifier that is the same as a mapping table row identifier stored in the secondary index row; and if the row in the database block matches the target database block, then the correct row in the database has been located and the query is completed.

11. The method according to claim 10, wherein if the row in the database block does not match the target database block, carrying out the query further comprises:

accessing the mapping table row stored in the secondary index row;

utilizing a guess-database block address stored in the mapping table row to access a target block of the database;

searching the target block for a primary key that matches a primary key stored in the mapping table row; and if the primary key is found, then the query is completed.

12. The method according to claim 11, wherein if the primary key is not located carrying out the query further comprises:

traversing the primary B+tree structure utilizing the primary key value from the mapping table row to identify the database address to complete the query.

13. The method according to claim 12, further comprising:

maintaining a guess-database block address quality statistic for the secondary index;

maintaining a guess-database block address quality statistic for the mapping table;

utilizing the statistics to assess guess-database block address quality; and carrying out the query based upon guess-database block address quality in the secondary index and mapping table.

14. The method according to claim 6, wherein only 4 bytes of the guess-database block address value are stored in the secondary index row.

15. A computer program product for performing a process of managing a database system, comprising:

a computer readable medium; and computer program instructions, recorded on the computer readable medium, executable by a processor, for performing the steps of:

creating a secondary index for a B+tree structure, wherein the secondary index structure comprises a plurality of rows each comprising an index key value, a mapping table rowid value and a guess-database block address value;

estimating guess-database block address quality;

estimating the cost of the query based upon the estimated guess-database block address quality; and carrying out the query starting with an index structure with the lowest estimated cost.

* * * * *

UNITED STATES PATENT AND TRADEMARK OFFICE
CERTIFICATE OF CORRECTION

PATENT NO. : 6,708,178 B1  Page 1 of 1
DATED : March 16, 2004
INVENTOR(S) : Chong et al.

It is certified that error appears in the above-identified patent and that said Letters Patent is hereby corrected as shown below:

<u>Column 9,</u>
Line 16, replace "from" with -- of --

Signed and Sealed this

Twenty-fifth Day of May, 2004

JON W. DUDAS
*Acting Director of the United States Patent and Trademark Office*